United States Patent Office 3,362,967
Patented Jan. 9, 1968

3,362,967
THIOETHER NAPHTHOXIDINE DERIVATIVES
Hans Bosshard, Basel, and Werner Bossard, Riehen,
Switzerland, assignors to J. R. Geigy A.-G., Basel,
Switzerland
No Drawing. Filed May 4, 1964, Ser. No. 364,839
Claims priority, application Switzerland, May 27, 1963,
6,547/63
6 Claims. (Cl. 260—396)

ABSTRACT OF THE DISCLOSURE

Naphthoxidine derivatives are provided which are of the formula

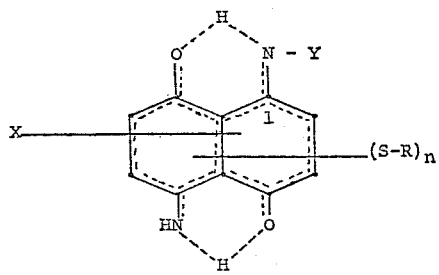

wherein R represents an organic radical, $n$ represents a number in the range between 1 and 2, X represents hydrogen or from 1 to 2 mercapto-compatible substituents and Y represents hydrogen or a hydrocarbon radical, such derivatives are valuable dyestuffs for organic fibers.

The present invention concerns novel substituted naphthoxidines, a process for the production thereof, a process for the dyeing of organic fibers as well as, as industrial product, the organic fibers dyed therewith.

It has been found that naphthoxidine derivatives which are valuable dyestuffs for organic fibers, are obtained by reacting an unsubstituted naphthoxidine of Formula I or a compound which is further substituted at the naphthalene nucleus and/or at the nitrogen in the 1- or 5- position of the naphthalene nucleus, of the formula

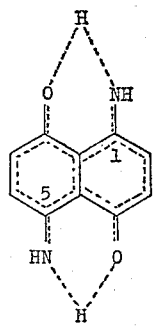

which compound also contains hydrogen bound to the nucleus which can also be replaced, with an organic mercapto compound of the formula

R—SH    (II)

wherein

R represents an organic radical defined in detail further below, to form a compound of the formula

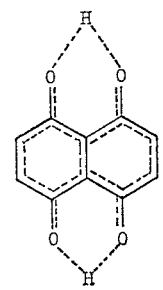

(III)

wherein

R has the meaning given in Formula II and $n$ is a number in the range between 1 and 2,
X represents hydrogen or from one to two mercapto-compatible substituents as defined more in detail further below, and
Y represents hydrogen or a hydrocarbon radical as defined further below.

The term naphthoxidine used herein embraces all possible mesomeric (resonance) forms of this compound, as illustrated in Formulas I and III.

The new naphthoxidines according to the invention of Formula II have a greenish blue to green color whilst starting naphthoxidines of the Formula I are violet. Thus, the introduction of the thioether group into the naphthoxidine molecule produces a strong bathochromic effect which was not to have been expected as the introduction of thioether substituents into the red naphthazarine of the formula produces no alteration in the shade.

R in Formulas II and III represents, for example, an aliphatic radical, particularly a lower alkyl radical, such as methyl, ethyl, propyl, butyl or amyl, preferably alkyl of from 3 to 5 carbon atoms, or it represents a substituted alkyl radical, the substituents being, e.g., the hydroxyl or lower alkoxy groups, having in particular 1 to 5 carbon atoms, i.e., for example, it is the β-hydroxyethyl, methoxyethyl or ethoxyethyl radical or a lower alkoxy-carbonyl-lower alkyl group, or a cycloaliphatic, in particular a cycloalkyl radical such as the cyclohexyl radical, or an araliphatic radical of the aromatic component of which is preferably of the benzene series such as the benzyl, methylbenzyl, chlorobenzyl, bromobenzyl or methoxybenzyl radical.

Compounds of Formula III wherein R is an aromatic radical, are particularly easily produced and of particularly good dyeing properties so that R is preferably such a radical.

Dyestuffs according to the invention are particularly suitable for dyeing polyester fibers when R therein is an unsubstituted or phenyl radical, having as substitution in its ring the following substituents: halogens such as chlorine or bromine, nitro, lower alkyl, hydroxy-lower alkyl, lower alkoxy-lower alkyl, lower alkoxy phenoxy groups.

In dyestuffs suitable for dyeing polyamide fibers, R is preferably sulfophenyl, nitro-sulfophenyl, carboxyphenyl or carboxy-lower alkyl.

Compounds of Formula III wherein R is a phenyl radical substituted by lower alkyl groups, preferably the 4-methylphenyl radical, are distinguished by a particularly pure shade with very good drawing power onto polyglycol terephthalate fibers and also good fastness properties, particularly fastness to sublimation.

"Lower" as used in connection with an aliphatic radical, in this specification and the appended claims, means a radical of from 1 to 4 carbon atoms unless expressly stated otherwise.

The "mercapto-compatible" substituents at the naphthalene nucleus of the naphthoxidine of Formula I or Formula III are selected from the following: chlorine and especially bromine, and as preferable substituents phenyl and phenyl ring-substituted by chlorine, bromine, nitro and the trifluoromethyl group; other substituents of such phenyl radicals are lower alkoxy-carbonyl, sulfamyl, N-lower alkyl-mono- and di-substituted, N-phenyl-substituted and N-phenyl-N-lower alkyl-substituted sulfamyl, as well as methylsulfonyl, ethylsulfonyl and phenylsulfonyl group.

The nitrogen atom in 1- or 5-position of the naphthalene nucleus can contain, as substituent Y, for example unsubstituted and substituted hydrocarbon radicals, particularly phenyl, or a phenyl group substituted e.g., by lower alkoxy groups, such as methoxy or ethoxy, lower alkyl, chlorine, bromine, hydroxy-lower alkyl, lower alkoxy-lower alkyl or lower alkoxycarbonyl. Preferably, however, this nitrogen atom is unsubstituted.

Compounds of Formula I the naphthalene nucleus of which and/or the nitrogen atom in the 1- or 5-position of the naphthalene nucleus of which may be substituted, are known or can be produced by known methods, for example, in part from 1,5-dinitronaphthalenes optionally substituted in 2-, 3-, 6-, or 7-position, by partial reduction with sulfur sesquioxide, and, if desired, by subsequent substitution, e.g., bromination of the resulting naphthoxidine. Starting compounds of Formula I which are substituted at the naphthalene nucleus by aromatic groups are obtained by reacting naphthoxidine with corresponding aromatic diazonium compounds while splitting off nitrogen.

A great number of organic mercapto compounds of Formula II usable according to the invention are known or can be produced by conventional methods. Phenylmercaptans substituted by lower alkyl groups are preferred, in particular 4-methyl-phenyl mercaptan.

The reaction partners are reacted advantageously in a polar organic solvent at room temperature or at a raised temperature. The most suitable solvents are those which are miscible with water such as methanol, ethanol, propanol, butanol, ethylene glycol or ethylene glycol monomethyl or monoethyl ether; lower aliphatic ketones such as acetone; cyclic acetals such as dioxan; lower fatty acids such as acetic acid; or lower hydrocarbon carboxylic acid amides such as dimethyl formamide. In some cases it is also possible to perform the reaction in aqueous dispersion or in a mixture of water and an organic solvent which is miscible with water. The rapidity of the reaction is greatly increased by hydrogen ions; this is mainly the case in a reaction in aqueous suspensions or solutions.

The use of acids such as sulfuric acid or hydrochloric acid, therefore, is indicated in these cases.

In many cases, the reaction products are obtained as mixtures of mono-thioether-substituted and bis-thioether-substituted compounds of Formula III. The mixtures are isolated in a conventional manner and may be further purifid by recrystallization or by chromatographic adsorption, for example, on an aluminum oxide column. As dyestuffs for fibers made from polymeric esters of aromatic polycarboxylic acids and polyvalent alcohols, however, the mixtures are advantageously used, as these have considerably better drawing power on such fibers than the individual components. Isolation of the latter is, therefore, usually superfluous, and may even be undesirable.

The dyestuffs according to the invention which contain groups which dissociate acid in water such as sulfonic acid or carboxylic acid groups, are suitable for the dyeing of synthetic polyamide fibers, such as for the dyeing of nylon; they are particularly suitable however, for the dyeing of natural polyamides, mainly of wool.

Preferred dyestuffs according to the invention contain no salt-forming groups which dissociate acid in water. These are suitable for the dyeing of hydrophobic organic fibers from an aqueous dispersion, for example for the dyeing of fibers consisting of high molecular organic esters such as cellulose di- to tri-acetate, particularly however, for the dyeing of fibers made from polymeric esters of aromatic polycarboxylic acids with polyvalent alcohols, chiefly for polyglycol terephthalate fibers. These dyestuffs, however, can also be used in aqueous dispersion for the dyeing of synthetic polyamide fibers such as nylon.

Polyester fibers are dyed with aqueous dispersions of the dyestuffs according to the invention preferably at temperatures of over 100° C. under pressure. However, the dyeing can also be performed at boiling temperatures in the presence of carriers such as phenylphenol, polychlorobenzene compounds or similar auxiliaries.

The naphthoxidine compounds according to the invention, falling under Formula III, dye the fibers mentioned in level, blue to green shades which have good fastness to light and sublimation.

The following non-limitative examples illustrate the invention further. Where not otherwise expressly stated, parts and percentages are given by weight. The temperatures are in degrees centigrade. The relationship of parts by weight to parts by volume is as that of gram to milliliter.

*Example 1*

10 parts of naphthoxidine in the form of its zinc chloride double salt, are dissolved in 250 parts of ethanol; 8 parts of 4-methylphenyl mercaptan are added to the solution and the reaction mixture is stirred at 20–30° for 8 hours. The green solution is then clarified by filtration and then the filtrate is concentrated to about a fifth of its volume. After cooling, the crystals which have formed are isolated, dried and purified by recrystallization from chlorobenzene. The dyestuff forms fine, greenish black crystals which have a red shimmer. They dissolve in polar organic solvents with a blue-green color, in concentrated sulfuric acid with a deep red-brown color.

Dispersed in water in the usual way, the dyestuff produces pure, blue-green dyeings on polyglycol terephthalate or cellulose acetate fibers which are fast to wet and light. The drawing power of the dyestuff onto polyglycol terephthalate as well as its fastness to sublimation are remarkably good.

If in the above example, with otherwise the same procedure, instead of the 8 parts of 4-methylphenyl mercaptan, corresponding amounts of the mercaptans given in the following Table I are used, then blue-green to green dyestuffs are obtained which have similar properties:

TABLE I

| No. | Mercaptan | Shade of Dyeing on Polyglycol Terephthalate Fibers |
| --- | --- | --- |
| 2 | Phenylmercaptan | Blue-green. |
| 3 | 2-methylphenyl mercaptan | Do. |
| 4 | 3-methylphenyl mercaptan | Do. |
| 5 | 3,4-dimethylphenyl mercaptan | Do. |
| 6 | 2,5-dimethylphenyl mercaptan | Do. |
| 7 | 2,4-dimethylphenyl mercaptan | Do. |
| 8 | 4-isopropylphenyl mercaptan | Do. |
| 9 | 4-chlorophenyl mercaptan | Greenish blue. |
| 10 | 2,5-dichlorophenylmercaptan | Do. |
| 11 | 3,4-dichlorophenyl mercaptan | Do. |
| 12 | 4-bromophenyl mercaptan | Do. |
| 13 | 2-nitrophenylmercaptan | Blue-green. |
| 14 | 4-nitrophenyl mercaptan | Green. |
| 15 | 4-methoxyphenyl mercaptan | Do. |
| 16 | Benzylmercaptan | Do. |
| 17 | 1-naphthyl mercaptan | Do. |
| 18 | 2-naphthyl mercaptan | Do. |

Example 19

10.0 parts of naphthoxidine, in the form of its zinc chloride complex, are boiled for a few minutes in 150 parts of glacial acetic acid. The solution is cooled to 70–80° C., 6.5 parts of 4-methylphenyl mercaptan are added, and the reaction mixture is kept for 8 hours at the temperature given. The mixture is poured into water and the product which precipitates is isolated. It is purified as described in Example 1 or by chromatographic adsorption on an aluminum oxide column.

In the chromatogram, the dyestuff shows a blue-green component which corresponds to the compound in which $n$ is 1, and a green component which corresponds to the compound in which $n$ is 2. The sulfur content of the dyestuff is 13.9% by weight which corresponds to $n=1.8$ in Formula III. Dyed onto polyglycol terephthalate fibers, it has properties similar to those of the product described in Example 1.

If in the above example with otherwise the same procedure, instead of the 6.5 parts of 4-methylphenyl mercaptan, corresponding amounts of the mercaptans given in the following Table II are used, then blue-green to green dyestuffs are obtained which have similar properties.

TABLE II

| No. | Mercaptan | Shade of Dyeing on Polyglycol Terephthalate Fibers |
| --- | --- | --- |
| 20 | Phenyl mercaptan | Blue-green. |
| 21 | 2-methylphenyl mercaptan | Do. |
| 22 | 3-methylphenyl mercaptan | Do. |
| 23 | 3,4-dimethylphenyl mercaptan | Do. |
| 24 | 4-isopropylphenyl mercaptan | Do. |
| 25 | 4-chlorophenyl mercaptan | Greenish blue. |
| 26 | 3,4-dichlorophenyl mercaptan | Do. |
| 27 | 2-nitrophenyl mercaptan | Do. |
| 28 | 4-nitrophenyl mercaptan | Green. |
| 29 | 4-methoxyphenyl mercaptan | Do. |
| 30 | 4-mercapto-diphenyl ether | Do. |
| 31 | Benzyl mercaptan | Blue-green. |
| 32 | Iso-amyl mercaptan | Do. |
| 33 | Mercapto acetic acid ethyl ester | Do. |
| 34 | Cyclohexyl mercaptan | Do. |
| 35 | n-Propyl mercaptan | Do. |
| 36 | 2-mercapto-ethanol | Do. |
| 37 | p-Chlorobenzyl mercaptan | Do. |
| 38 | p-Methylbenzyl mercaptan | Do. |
| 39 | p-Bromobenzyl mercaptan | Do. |
| 40 | p-Methoxybenzyl mercaptan | Do. |
| 41 | 2-nitro-4-sulfo-phenyl mercaptan | Do. |
| 42 | 2-β-methoxy-ethyl mercaptan | Do. |
| 43 | 4-(2'-methoxy-ethyl)-phenyl mercaptan. | Do. |
| 44 | 4-(hydroxymethyl)-phenyl mercaptan | Do. |

Example 45

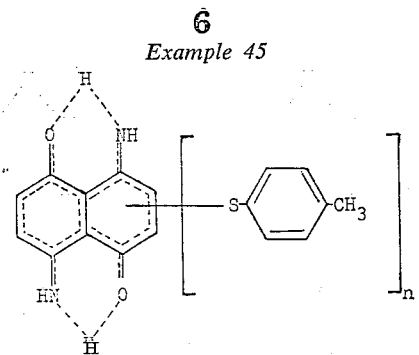

10.0 parts of finely pulverized naphthoxidine are stirred into 60 parts of glacial acetic acid and 8 parts of 4-methylphenyl mercaptan are added. This mixture is poured into 400 parts of water, 50 parts of 20% sulfuric acid are added and the suspension is stirred for 3 hours at 20–30°.

The product is filtered off and recrystallized from ethanol. In the chromatogram, it shows mainly a blue-green component with a minor green component. The dyestuff dissolves in organic solvents with a greenish blue color.

From an aqueous dispersion it dyes polyglycol terephthalate fibers in a more blue shade than the dyestuffs according to Examples 1 to 38.

The sulfur content of the end product is 11.2% compared with a calculated value for the monosubstitution product of 10.3%, which corresponds to a value for $n$ in the above formula of 1.1.

The same result is obtained if, according to the above example, 11.5 parts of the zinc chloride complex are used instead of naphthoxidine.

Example 46

8.0 parts of a compound of the formula

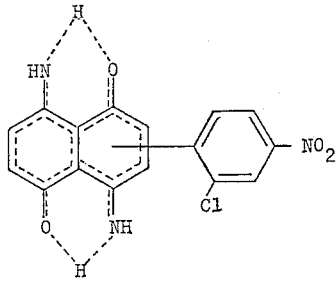

and 5.0 parts of 4-methylphenyl mercaptan in 200 parts of glacial acetic acid are kept for 2 hours at a temperature of 80°. The product is worked up and purified as described in Example 19. The dyestuff has a more green shade than the starting material and the $R_f$-value of the chromatogram is different from the latter. Dyed onto polyglycol terephthalate in the usual way, it draws from an aqueous dispersion in a blue-green, pure shade. It has good drawing power. The sulfur content of this dyestuff was found to be 7.0% by weight which corresponds to $n=1.05$ in Formula III.

The (4-nitro-2-chlorophenyl)-naphthoxidine of the above formula which is used as starting material is obtained by reacting 4-nitro-2-chlorobenzene diazonium chloride with naphthoxidine, with splitting off of nitrogen.

Further naphthoxidines according to the invention of similar properties are obtained in accordance with the procedure given in Example 46 by the reaction, illustrated in the heading of the following Table III, by reacting the naphthoxidines of Formula IA the substituents of which are listed in the second column of the aforesaid table, with the mercaptans of the Formula HSR, given in the third column of the said table thereby obtaining the corresponding X— and R—S substituted naphthoxidines falling under Formula IIA.

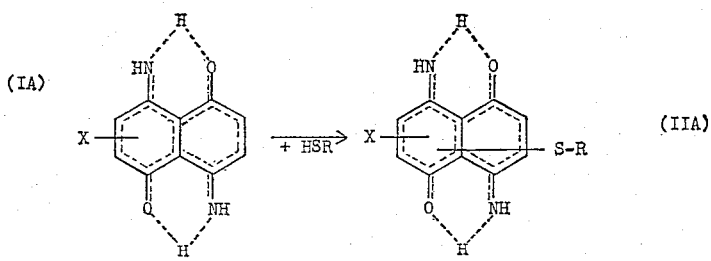

TABLE III

| No. | X | Mercaptan | Shade of Dyeing on Polyglycol Terephthalate Fibers |
|---|---|---|---|
| 47 | —⟨phenyl⟩—Cl | 2-methylphenyl mercaptan | Greenish blue. |
| 48 | —⟨phenyl, Cl⟩—Cl | 4-methylphenyl mercaptan | Do. |
| 49 | —⟨phenyl, Cl, Cl⟩—Cl | n-Propyl mercaptan | Blue-green. |
| 50 | —⟨phenyl, CF₃⟩—Cl | 4-methylphenyl mercaptan | Greenish blue. |
| 51 | —⟨phenyl⟩—NO₂ | 4-chlorophenyl mercaptan | Do. |
| 51a | —⟨phenyl, Cl, Cl⟩—Cl | 2-methylphenyl mercaptan | Blue-green. |
| 52 | —⟨phenyl, Cl⟩—NO₂ | Isoamyl mercaptan | Greenish blue. |
| 53 | —⟨phenyl, Cl⟩—NO₂ | 2-mercaptoethanol | Do. |
| 54 | —⟨phenyl, Br⟩—NO₂ | 4-methylphenyl mercaptan | Do. |
| 55 | —⟨phenyl, COOCH₃⟩—NO₂ | ___do___ | Do. |
| 56 | —⟨phenyl⟩—SO₂NH₂ | ___do___ | Do. |
| 57 | —⟨phenyl⟩—SO₂CH₃ | ___do___ | Do. |
| 58 | —⟨phenyl⟩—SO₂N(C₂H₅)₂ | ___do___ | Do. |
| 59 | 3,7-dibromo- [1] | ___do___ | Blue-green. |
| 60 | 3-chloro- [1] | ___do___ | Do. |
| 61 | 2,6-dichloro- [2] | ___do___ | Do. |

[1] 3,7-dichloro- and 3-chloro-naphthoxidine are produced according to German Patent 841,314.
[2] 2,6-dichloro naphthoxidine has been described by Merian in "Chemia" 13, p. 188 (1959).

Further naphthoxidines according to the invention of similar properties are obtained in accordance with the procedure given in Example 46 by the reaction illustrated in the heading of the following Table IV, by reacting the naphthoxidines of Formula IB the substituent Y of which are listed in the second column of the aforesaid table, with the mercaptans listed in the third column of said table, thereby obtaining the corresponding Y— and R—S substituted naphthoxidines falling under Formula IIB.

monium phosphate are added to this dispersion and 100 parts of polyglycol terephthalate yarn are dyed for 1½ hours at 95–98°. The dyeing is rinsed and after-treated with dilute sodium hydroxide solution and a dispersing agent, e.g., a condensation product of naphthalene sulfonic acid and formaldehyde.

A blue-green dyeing is so obtained which is fast to washing, sublimation and light.

If in this example, the 100 parts of polyglycol terephthalate yarn are replaced by 100 parts of cellulose tri-

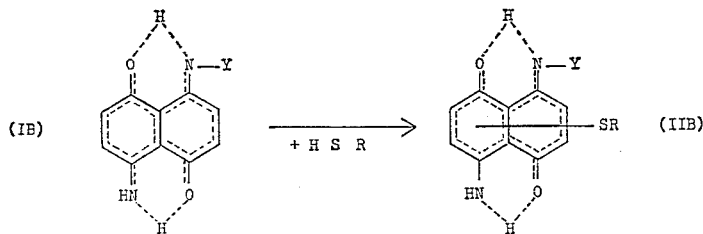

TABLE IV

| No. | Y | —SR | Shade of Dyeing on Polyglycol Terephthalate Fibers |
|---|---|---|---|
| 62 | —⟨phenyl⟩—OC₂H₅* | 4-methylphenyl mercaptan | Green. |
| 63 | —⟨phenyl⟩ | do | Do. |
| 64 | —⟨phenyl⟩—CH₃ | do | Do. |
| 65 | —⟨phenyl⟩—Br | do | Do. |
| 66 | —⟨phenyl⟩—Cl | do | Do. |
| 67 | —⟨phenyl⟩—CH₂CH₂OH | 2-methylphenyl mercaptan | Do. |
| 68 | —⟨phenyl⟩—CH₂OCH₃ | do | Do. |
| 69 | —⟨phenyl⟩—CO—OCH₃ | 4-chlorophenyl mercaptan | Do. |

*Produced as described in German Patent 636,267.

*Example 70*

8.0 parts of naphthoxidine in the form of its zinc chloride complex are dissolved in 150 parts of glacial acetic acid and 5.0 parts of mercapto acetic acid are added. The reaction mixture is then kept for 1½ hours while stirring at a temperature of 70–80° whereupon it is diluted with water. The precipitated product is filtered off, dissolved in dilute sodium carbonate solution and the solution is clarified by filtration. The dyestuff is precipitated by acidifying the filtrate and is isolated. On extracting with ethanol, it is obtained in a pure, uniform form. From an acetic acid bath, it dyes wool in a greenish blue shade which becomes green on after-chroming. The content of sulfur in this dyestuff was found to be 13.9% which corresponds to $n=1.4$ in Formula III.

Similar dyestuffs are obtained by the process described in the above example on using equivalent amounts of α-mercapto propionic acid or of thiosalicylic acid instead of mercapto acetic acid.

*Example 71*

2 parts of the dyestuff obtained according to Example 1 are dispersed in 4000 parts of water. 12 parts of the sodium salt of o - phenylphenol and 12 parts of diamacetate fabric, the dyeing is performed under the conditions described and the fabric is afterwards rinsed with water, then a blue-green dyeing is obtained which is distinguished by high grade fastness to wet and light.

*Example 72*

2 parts of the dyestuff obtained according to Example 46 are suspended in 2000 parts of water containing 4 parts of a synthetic dispersing agent. The suspension is made in a pressure dyeing apparatus. The pH of the dye bath is adjusted to 6.0–6.5 with acetic acid. 100 parts of polyglycol terephthalate fabric are introduced at 50°, the bath is heated to 130° within 30 minutes and dyeing is performed for 50 minutes at this temperature. The dyeing is rinsed, soaped and dried. A blue-green dyeing of pure shade is obtained which is fast to washing and light and has very good fastness to sublimation.

*Example 73*

2 parts of the dyestuff obtained according to Example 8 are finely suspended in 3000 parts of water which contains 6 parts of a synthetic dispersing agent. 100 parts of cellulose acetate fabric are introduced at 30–40°, the temperature is raised within 30 minutes to 80° and dyeing is performed at this temperature for 50 minutes. The blue-green dyeing obtained is rinsed and dried. It has very good fastness to water, washing and light.

We claim:
1. A naphthoxidine dyestuff falling under the formula

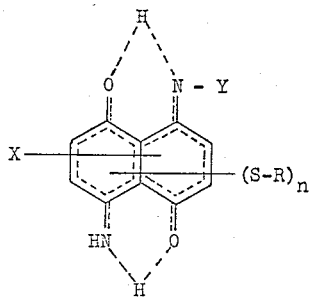

wherein
R represents a member selected from the group consisting of alkyl of from 1 to 5 carbon atoms, hydroxyalkyl of from 1 to 5 carbon atoms, lower alkoxy-lower alkyl, lower alkoxy-carbonyl-lower alkyl, cyclohexyl, benzyl, methylbenzyl, chlorobenzyl, bromobenzyl, methoxybenzyl, phenyl, lower alkylphenyl, hydroxy-lower alkylphenyl, lower alkoxy-lower alkylphenyl, lower alkoxyphenyl, phenoxyphenyl, chlorophenyl, bromophenyl and nitrophenyl, X represents a member selected from the group consisting of hydrogen and from one to two mercapto-compatible substituents selected from chlorine, bromine, unsubstituted phenyl, and phenyl ring-substituted by the following: chlorine, bromine, nitro, trifluoromethyl, lower alkoxy-carbonyl, sulfamoyl, N-lower alkyl-sulfamoyl, N,N-di-lower alkyl-sulfamoyl, N-phenyl-sulfamoyl, N-phenyl-N-lower alkyl-sulfamoyl, methylsulfonyl, ethylsulfonyl, phenylsulfonyl, ethoxy, hydroxyethyl, methoxymethyl, Y is a member selected from the group consisting of hydrogen, phenyl, lower alkoxyphenyl, lower alkylphenyl, bromophenyl, chlorophenyl, hydroxy-lower alkyl-phenyl, lower alkoxy-lower alkylphenyl and lower alkoxy-carbonylphenyl, and n is a member falling in the range between 1 and 2.

2. A naphthoxidine dystuff falling under the formula

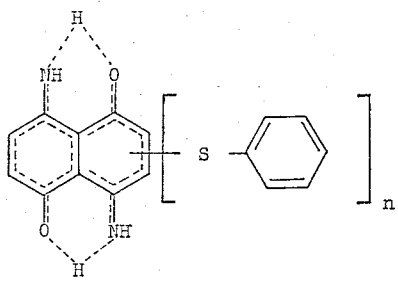

wherein
n is a number within the range of from 1 to 2.

3. A napthoxidine dyestuff falling under the formula

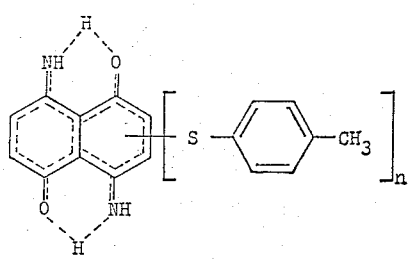

wherein
n is a number within the range of from 1 to 2.

4. A naphthoxidine dyestuff falling under the formula

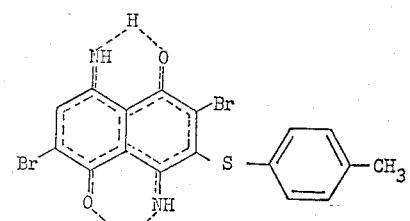

5. A napthoxidine dyestuff falling under the formula

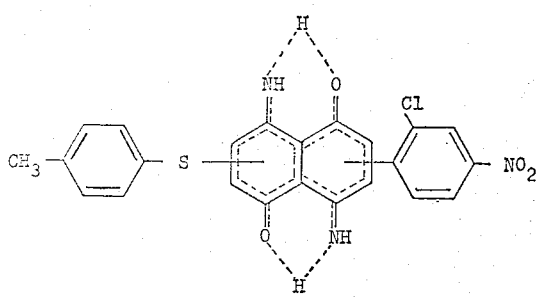

6. A napthoxidine dyestuff falling under the formula

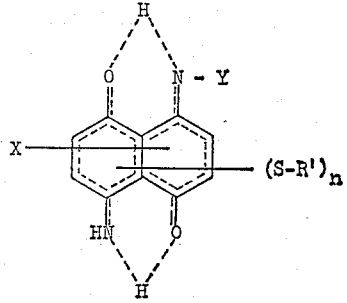

wherein
R' represents a member selected from the group consisting of sulfophenyl and nitrosulfophenyl, X represents a member selected from the group consisting of hydrogen and from 1 to 2 mercapto-compatible substituents selected from chlorine, bromine, unsubstituted phenyl, and phenyl ring-substituted by the following: chlorine, bromine, nitro, trifluoromethyl, lower alkoxy-carbonyl, sulfamoyl, N-lower-alkyl-sulfamoyl, N,N-di-lower alkyl-sulfamoyl, N-phenyl-sulfamoyl, N-phenyl-N-lower alkyl-sulfamoyl, methyl-sulfonyl, ethylsulfonyl, phenylsulfonyl, ethoxy, hydroxyethyl, methoxy-methyl;

Y is a member selected from the group consisting of hydrogen, phenyl, lower alkoxy phenyl, lower alkyl phenyl, bromo phenyl, chloro phenyl, hydroxy-lower alkyl phenyl, lower alkoxy-lower alkyl phenyl and lower alkoxy carbonyl-phenyl; and n is a number within the range between 1 and 2.

References Cited
FOREIGN PATENTS
670,969   4/1952   Great Britain.

LORRAINE A. WEINBERGER, *Primary Examiner.*
L. A. THAXTON, *Assistant Examiner.*